(12) United States Patent
Ren

(10) Patent No.: US 12,685,372 B1
(45) Date of Patent: Jul. 21, 2026

(54) WATER CUP SUPPORT DEVICE AND WATER CUP STORAGE SYSTEM

(71) Applicant: MINI POWER CO., LIMITED, Hong Kong (CN)

(72) Inventor: Xia Ren, Changsha (CN)

(73) Assignee: MINI POWER CO., LIMITED, Hong Kong (CN)

( * ) Notice: Subject to any disclaimer, the term of this patent is extended or adjusted under 35 U.S.C. 154(b) by 0 days.

(21) Appl. No.: 19/250,060

(22) Filed: Jun. 26, 2025

(30) Foreign Application Priority Data

Apr. 3, 2025 (CN) .......................... 202530176586.6

(51) Int. Cl.
| | |
|---|---|
| *A45C 13/00* | (2006.01) |
| *A45C 3/06* | (2006.01) |
| *A45C 13/02* | (2006.01) |
| *A45C 13/08* | (2006.01) |
| *A45C 13/10* | (2006.01) |
| *F16B 47/00* | (2006.01) |

(52) U.S. Cl.
CPC .............. *A45C 13/001* (2013.01); *A45C 3/06* (2013.01); *A45C 13/02* (2013.01); *A45C 13/08* (2013.01); *A45C 13/1069* (2013.01); *F16B 47/00* (2013.01); *A45C 2013/026* (2013.01); *A45C 2200/20* (2013.01)

(58) Field of Classification Search
CPC ......... A45C 13/001; A45C 3/06; A45C 13/02; A45C 13/08; A45C 13/1069; A45C 2013/026; A45C 2200/20; F16B 47/00
See application file for complete search history.

(56) References Cited

U.S. PATENT DOCUMENTS

| | | | | |
|---|---|---|---|---|
| D265,880 S | * | 8/1982 | Craig ............................ | D7/622 |
| 4,570,835 A | * | 2/1986 | Criqui ..................... | B62J 11/04 |
| | | | | 224/446 |
| 6,390,431 B1 | * | 5/2002 | Ott ....................... | F16M 13/022 |
| | | | | 248/229.23 |
| 6,729,665 B1 | * | 5/2004 | Posey ................. | B65D 23/106 |
| | | | | 215/396 |
| 8,500,076 B2 | * | 8/2013 | Lai ............................ | B62B 9/26 |
| | | | | 248/102 |
| 9,241,554 B1 | * | 1/2016 | Tong ...................... | A45C 13/00 |

(Continued)

OTHER PUBLICATIONS

Oudizz Bogg Bag Cup Holder: https://www.amazon.com/Adjustable-Compatible-Southern-Attachment-Accessories/dp/B0F5VB2Q62?th=1) (Year: 2025).*

(Continued)

*Primary Examiner* — Nathan J Jenness
*Assistant Examiner* — Justin Caudill
(74) *Attorney, Agent, or Firm* — AVEK IP, LLC

(57) ABSTRACT

A water cup support device for supporting a water cup on a carrying member is provided. The water cup support device includes at least one hanging body and a connecting assembly. The at least one hanging body defines a receiving cavity. The receiving cavity axially penetrates the at least on hanging body. A circumferential inner wall of the at least one hanging body defining the receiving cavity forms a force-bearing face matched with an outer wall of the water cup. The connecting assembly is arranged on the at least one hanging body and is configured to fix the at least one hanging body to the carrying member.

18 Claims, 16 Drawing Sheets

(56) References Cited

U.S. PATENT DOCUMENTS

| | | | |
|---|---|---|---|
| 9,944,209 B1 * | 4/2018 | Carnevali | F16M 11/2028 |
| 11,246,442 B2 * | 2/2022 | Huff | A47G 29/093 |
| 11,547,229 B1 * | 1/2023 | Soares De Oliveira | A45C 11/182 |
| 2005/0017145 A1 * | 1/2005 | Kent-Fawkes | B65D 23/106 248/311.2 |
| 2011/0079696 A1 * | 4/2011 | Hofferber | A47G 23/0225 248/313 |
| 2014/0239656 A1 * | 8/2014 | Hancey | A45F 5/10 294/170 |
| 2016/0374489 A1 * | 12/2016 | Knoll | A47G 23/0266 220/741 |
| 2017/0055745 A1 * | 3/2017 | Boymel | A47K 10/14 |
| 2020/0017279 A1 * | 1/2020 | Quinn | B65D 81/3876 |

OTHER PUBLICATIONS

Moszandi Cup Holder: https://www.amazon.com/Holder-Attachment-Automotive-Compatible-Southern/dp/B0D5CMTST7?th=1 (Year: 2024).*

Moszandi Bogg Bag Phone Holder: https://www.amazon.com/MOSZANDI-Compatible-Silicone-Waterproof-Accessories/dp/B0D5CMQW7V (Year: 2024).*

* cited by examiner

WATER CUP SUPPORT DEVICE AND WATER CUP STORAGE SYSTEM

CROSS REFERENCE TO RELATED APPLICATIONS

The present application claims the priority of the Chinese Design Application No. 202530176586.6, filed on Apr. 3, 2025, and contents of which are incorporated herein by its entireties.

FIELD

The present disclosure relates to the field of cup storage, and particularly to a water cup support device and a water cup storage system.

BACKGROUND

Fabric water cup support structures in related art have connection straps with hook-and-loop fasteners. The connection straps are threaded through holes in a satchel to secure the support structure. This requires adjusting the hook-and-loop fastener repeatedly to accommodate water cups of different sizes, especially those with handles, resulting in cumbersome operation and poor stability. After prolonged use, the hook-and-loop fastener may lose adhesiveness and is prone to snagging on user's clothing.

SUMMARY

The present disclosure provides a water cup support device. The water cup support device includes at least one hanging body and a connecting assembly. The at least one hanging body defines a receiving cavity. The receiving cavity axially penetrates the at least on hanging body. A circumferential inner wall of the at least one hanging body defining the receiving cavity forms a force-bearing face matched with an outer wall of the water cup. The connecting assembly is arranged on the at least one hanging body and is configured to fix the at least one hanging body to the carrying member.

The present disclosure provides a water cup storage system. The water cup storage system includes the water cup support device and a satchel. The satchel includes a bag body, and the bag body defines a plurality of mounting holes. The water cup support device is configured to support a water cup on the satchel and includes at least one hanging body and a connecting assembly. The at least one hanging body defines a receiving cavity. The receiving cavity axially penetrates the at least on hanging body. A circumferential inner wall of the at least one hanging body defining the receiving cavity forms a force-bearing face matched with an outer wall of the water cup. The connecting assembly is arranged on the at least one hanging body, passes through the plurality of mounting holes, and fixes the at least one hanging body to an exterior or interior of the bag body. The water cup is vertically insertable in the receiving cavity of the at least one hanging body.

BRIEF DESCRIPTION OF THE DRAWINGS

To provide a clearer illustration of the technical solutions in the embodiments of the present disclosure or in the related art, a brief introduction will be given to the drawings used in the description of the embodiments or the related art. It is obvious that the drawings described below are merely some embodiments of the present disclosure, and for those skilled in the art, other drawings can be obtained based on these drawings without creative efforts.

NUMERAL REFERENCES IN THE DRAWINGS

Figure 1:
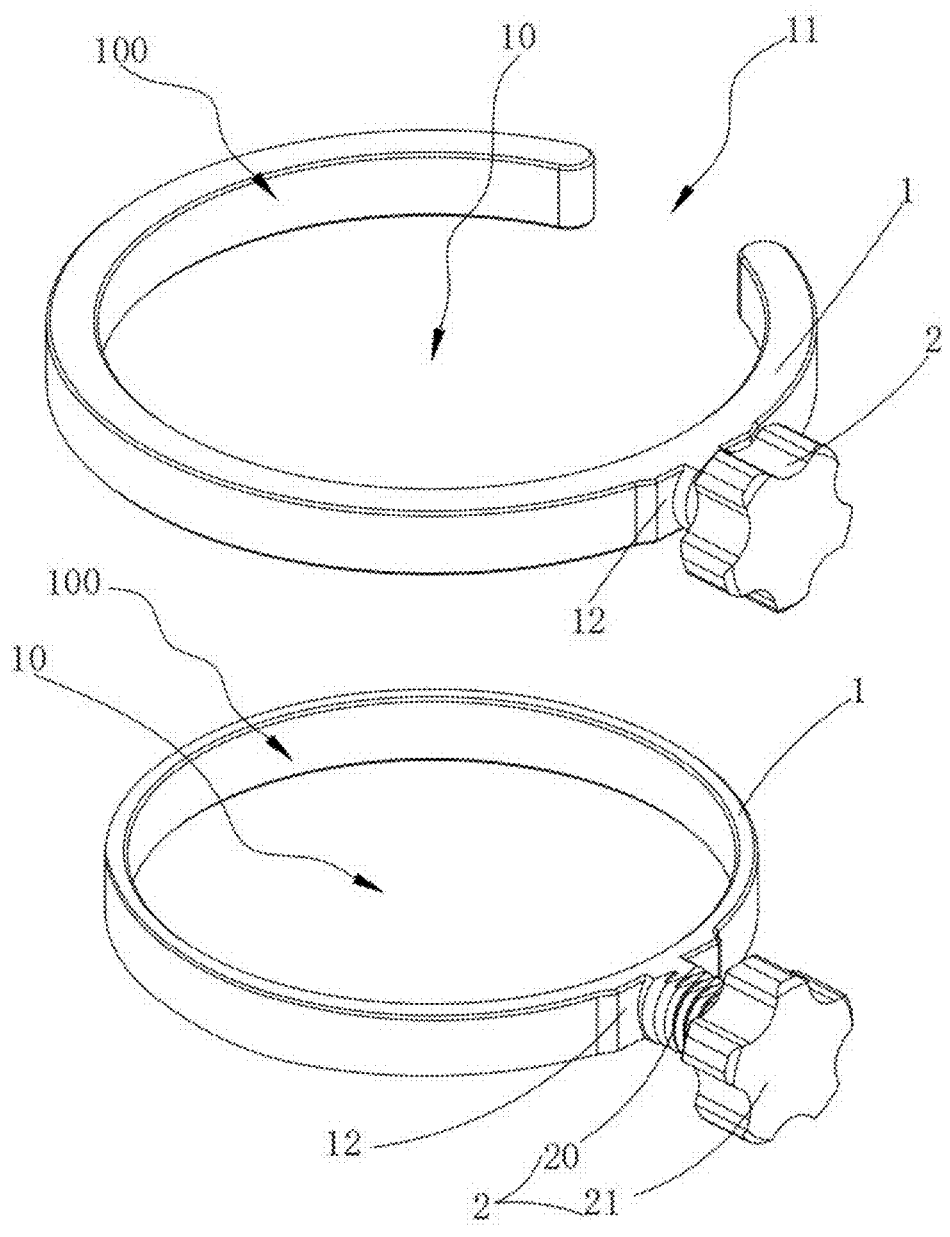
FIG. 1 is a schematic view of an overall structure of a water cup support device according to Embodiment I of the present disclosure.

1—hanging body; 10—receiving cavity; 100—force-bearing face; 11—avoidance gap; 12—contact wall face; 13—external interface; 130—top opening; 131—side opening;

2—connecting assembly; 20—connecting stud; 21—limiting nut; 22—connecting post; 23—limiting block; 24—connecting suction cup;

3—support member;

4—water cup; 40—handle; 41—upper cup body; 42—lower cup body;

5—carrying member; 50—satchel; 500—mounting hole;

6—functional accessory; 60—decorative object; 600—decorative petal; 601—T-shaped column;

7—connecting structure;

L1—axis of the connecting assembly; L2—axis of the avoidance gap.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Referring to FIGS. 1-14, the present disclosure provides a water cup support device. The water cup support device includes at least one hanging body 1 and a connecting assembly 2.

The hanging body 1 defines a receiving cavity 10. The receiving cavity 10 axially penetrates the hanging body 1. A circumferential inner wall of the hanging body 1 defining the receiving cavity 10 forms a force-bearing face 100 matched with an outer wall of a water cup 4.

The connecting assembly 2 is arranged on the hanging body 1. The connecting assembly 2 is configured to fix the hanging body 1 to a carrying member 5.

Figure 7:
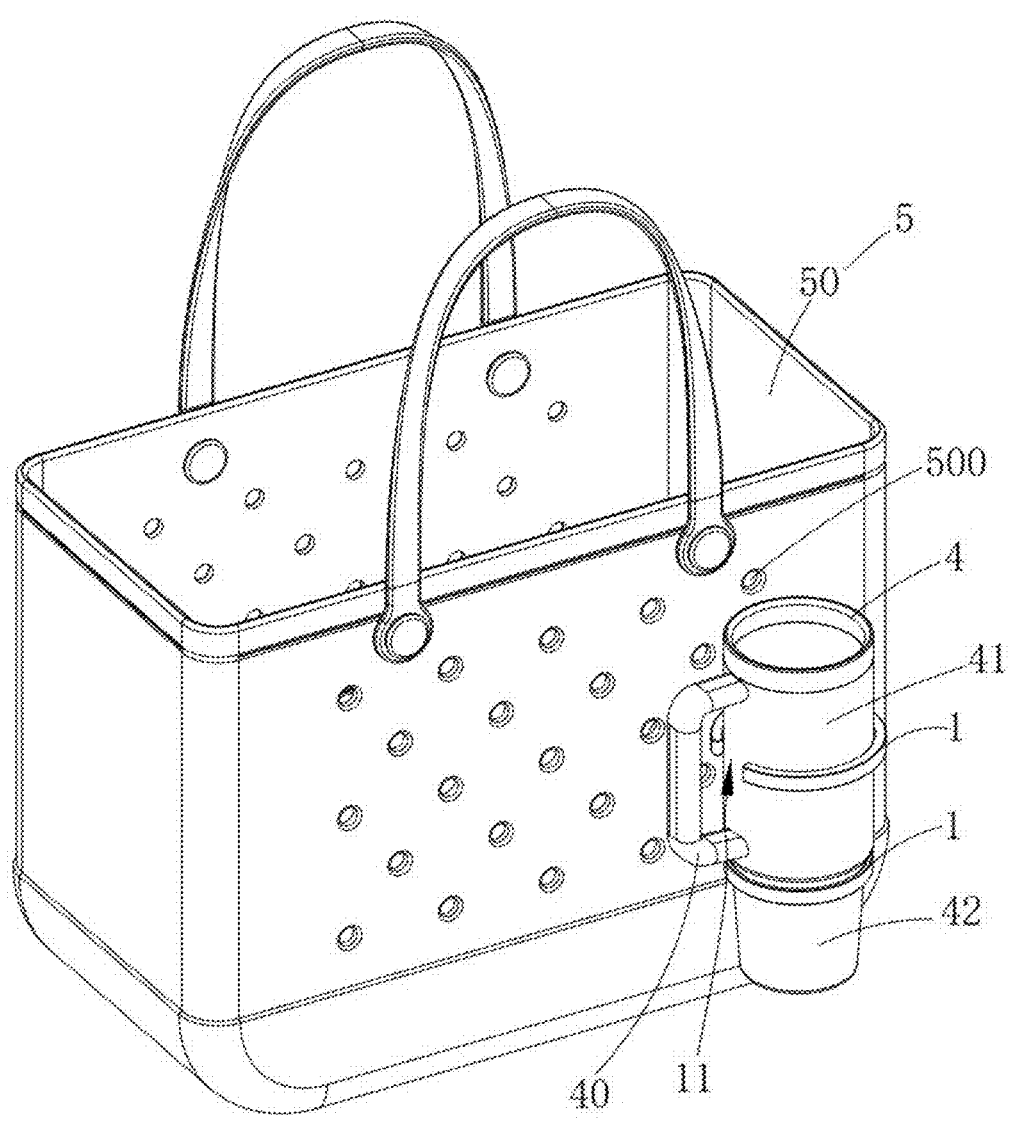
FIG. 7 is a schematic view of the overall structure of the water cup support device according to Embodiment IV of the present disclosure.

Specifically, a shape of the force-bearing face 100 may be arranged according to a shape of the water cup 4. For example, for a cylindrical or quasi-cylindrical water cup 4, the force-bearing face 100 may be annular, allowing the force-bearing face 100 to closely fit the outer wall of the water cup 4. The water cup 4 is fixed in the receiving cavity 10 through friction between the force-bearing face 100 and the outer wall of the water cup 4. That is, after a bottom portion of the water cup 4 passes through the receiving cavity 10, a portion of the outer wall of the water cup 4 tightly contacts the force-bearing face 100, preventing the water cup 4 from falling due to gravity or shaking laterally. The water cup support device can be applied to carrying members 5 such as satchels 50, backpacks, or wall cavities. For example, when the carrying member 5 is a satchel 50 as shown in FIG. 7, which has a plurality of holes for hanging decorative items or functional accessories 6, the connecting assembly 2 can be threaded through a hole close to a top portion of the satchel 50 to fix the hanging body 1 to an outer face or inner face of the satchel 50. The receiving cavity 10 of the hanging body 1 is axially penetrating in a direction of gravity, allowing the water cup 4 to be inserted in the receiving cavity 10. The outer wall of the water cup 4 closely contacts the force-bearing face 100 and is stabilized by the hanging body 1, while further stability is enhanced by contact with the outer face of the satchel 50. In summary, the water cup support device adapts the force-bearing face 100 of the hang body 1 defining the receiving cavity 10 to the outer wall of the water cup 4, utilizing friction between the force-bearing face 100 and the outer wall of the water cup 4 to secure the water cup 4 to the water cup support device. In this way, a need for additional structures to fasten the water cup 4 in place can be eliminated, thereby simplifying the structure and enhancing the stability of the water cup 4 on the corresponding carrying member 5. This solution addresses issues such as easy detachment and cumbersome operation associated with traditional hook-and-loop fastening methods.

It should also be noted that the number of the at least one hanging body 1 can be determined based on a length of the water cup 4, and the at least one hanging body 1 may include one, two, three, or more hanging bodies 1.

Figure 2:
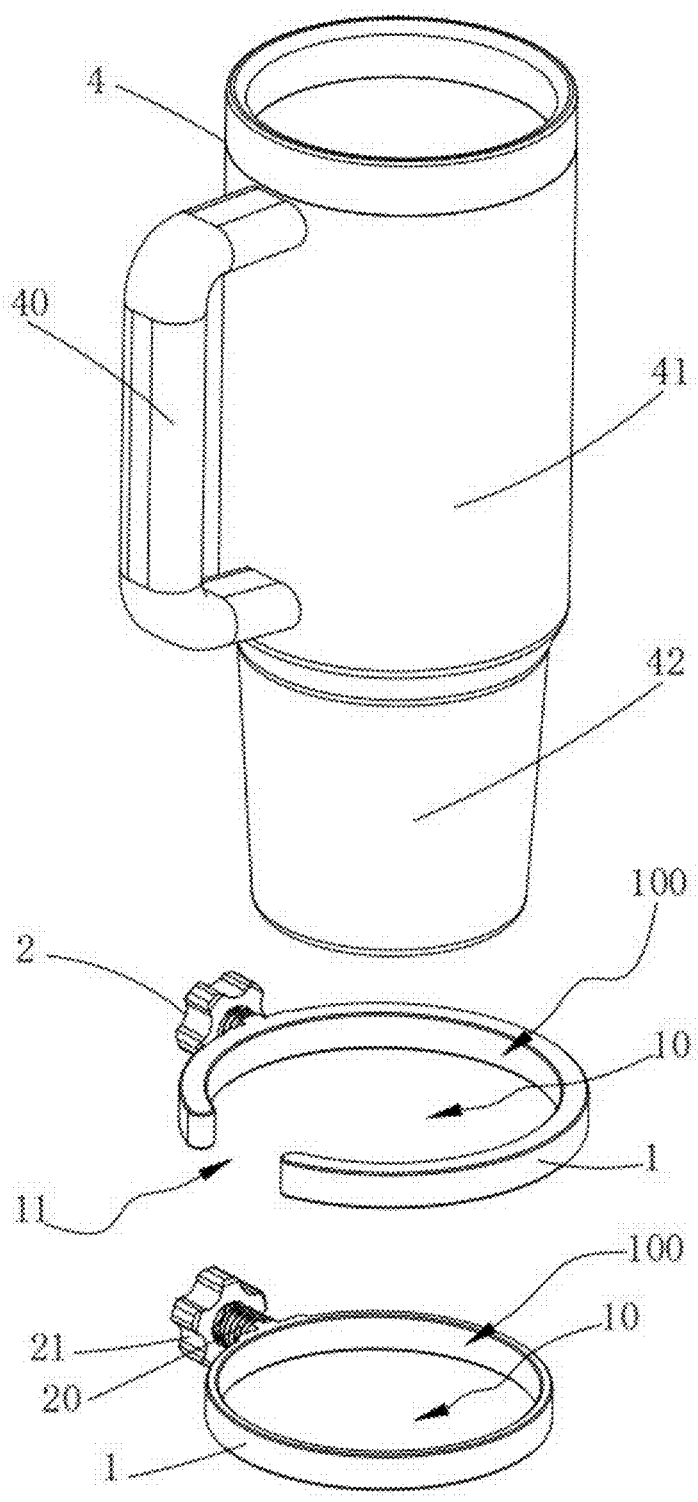
FIG. 2 is another schematic view of the overall structure of the water cup support device according to Embodiment I of the present disclosure.
Figure 3:
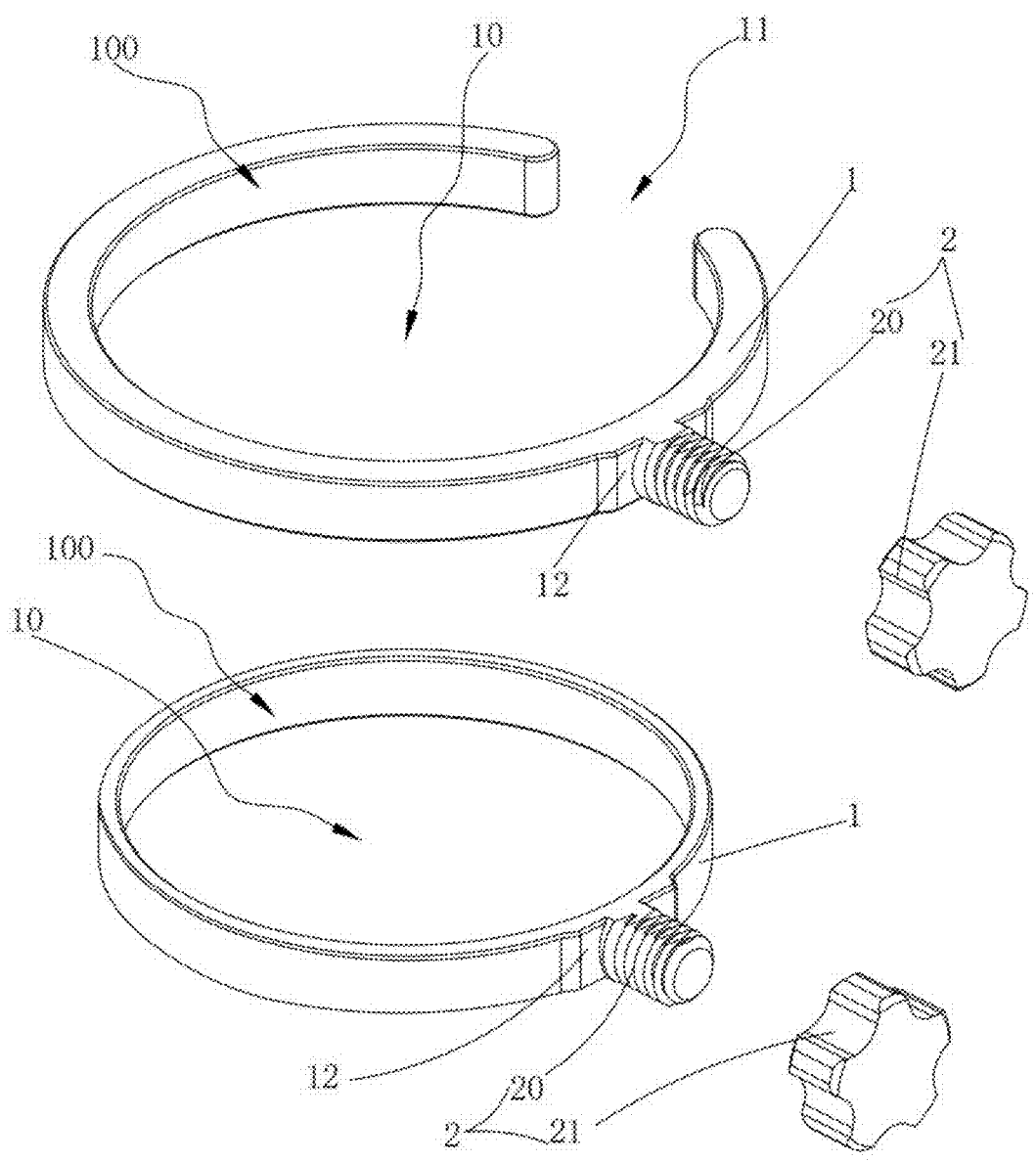
FIG. 3 is an exploded view of the water cup support device according to Embodiment I of the present disclosure.

Referring to FIG. 2, in some embodiments, the force-bearing face 100 is annular, and an inner diameter of the force-bearing face 100 is smaller than a maximum outer diameter of the water cup 4, such that the force-bearing face 100 can be in an interference fit with a portion of the outer wall of the water cup 4. The hanging body 1 may be arranged as a ring structure as shown in FIG. 3. An inner cavity of the ring structure forms the receiving cavity 10, and an inner wall of the ring structure forms the force-bearing face 100. The ring-shaped hanging body 1 has a simple structure, facilitating production and transportation, and an overall product is compact and aesthetically pleasing. For quasi-conical water cups 4, where an outer diameter of a portion of the water cup 4 close to a mouth portion of the water cup 4 is larger and an outer diameter of a portion of the water cup 4 close to a bottom portion of the water cup 4 is smaller, the inner diameter of the force-bearing face 100 falls between the maximum outer diameter of the water cup 4 and a minimum outer diameter of the water cup 4. During use, the water cup 4 is inserted vertically in the receiving cavity 10 of the hanging body 1, and the force-bearing face 100 restricts the water cup 4 from axial detachment from the receiving cavity 10 or radial shaking.

To further enhance the stability between the water cup 4 and the water cup support device, ensuring the water cup 4 remains securely mounted on the carrying member 5, in some embodiments, at least two hanging bodies 1 are provided, or it can be understood that the at least one hanging body 1 includes at least two sub-hanging bodies. The inner diameter of the force-bearing face 100 of one of the two hanging bodies 1 is different from the inner diameter of the force-bearing face 100 of the other of the two hanging bodies 1. The two hanging bodies 1 are spaced apart from each other on the carrying member 5. The receiving cavity 10 of one of the two hanging bodies 1 is coaxially arranged with the receiving cavity 10 of the other of the two hanging bodies 1. Specifically, the inner diameter of the force-bearing face 100 of one of the two hanging bodies 1 may be arranged to match the outer diameter of the portion of the water cup 4 close to the bottom portion of the water cup 4, while the inner diameter of the force-bearing face 100 of the other of the two hanging bodies 1 may be arranged to match the outer diameter of the portion of the water cup 4 close to the mouth portion of the water cup 4. The water cup 4 is inserted vertically from top to bottom through the larger hanging body 1 and then the smaller hanging body 1, achieving dual fixation by the larger hanging body 1 and the smaller hanging body 1. The spaced arrangement of the two hanging bodies 1 provides uniform axial support for the water cup 4, ensuring stable mounting on the carrying member 5. In some embodiments, each of the two hanging bodies 1 is connected to a middle portion of the water cup 4, with the larger hanging body 1 closely contacting an upper-middle outer wall of the water cup 4 and the smaller hanging body 1 closely contacting a lower-middle outer wall of the water cup 4. A spacing between the two hanging bodies 1 can be adjusted for water cups 4 of different heights, improving versatility of the water cup support device. Additionally, since water cups 4 are typically cylindrical, the two hanging bodies 1 are assembled on the carrying member 5 with the receiving cavities 10 of the two hanging bodies 1 coaxially arranged with each other to ensure stable mounting of the water cup 4 to the carrying member 5.

Figure 16:
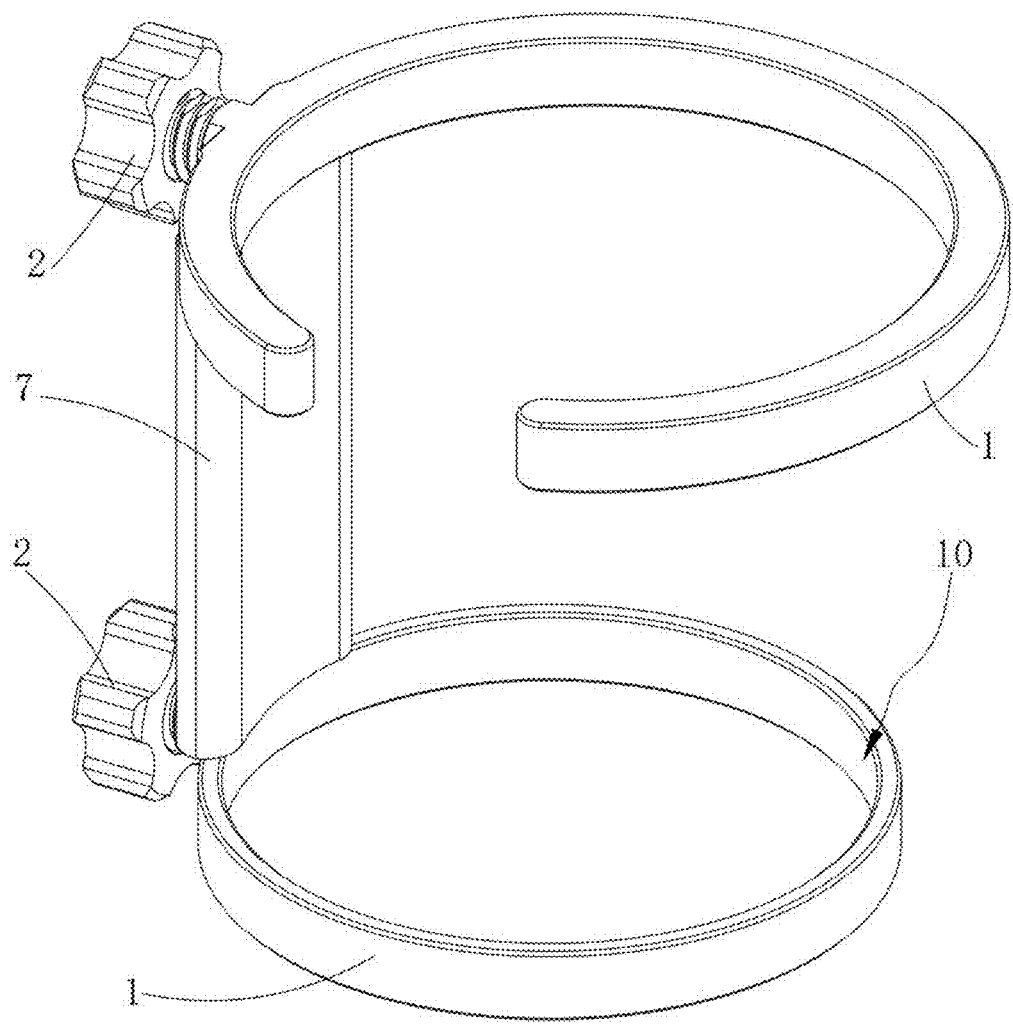
FIG. 16 is a schematic view of the overall structure of the water cup support device according to Embodiment VIII of the present disclosure, showing a connecting structure.

Referring to FIG. 16, in some embodiments, the water cup support device further includes a connecting structure 7 that can adhere to the carrying member 5. Two hanging bodies 1 are spaced apart from each other on the connecting structure 7, and the receiving cavities 10 of the two hanging bodies 1 are coaxially arranged with each other. Specifically, the connecting structure 7 may be a plate-like structure. An inner wall of the connecting structure 7 is in an arc shape to match a curved outer wall of the water cup 4 to increase a contact area between the water cup 4 and the water cup support device and stability of the water cup 4 on the water cup support device. An outer wall of the connecting structure 7 may be flat or shaped to match a shape of a surface of the carrying member 5. When the two hanging bodies 1 are fixed to the carrying member 5 via the connecting assembly 2, the outer wall of the connecting structure 7 adheres to the outer wall of the carrying member 5, and a contact area of the water cup support device and the carrying member 5, thereby enhancing stability and ensuring secure mounting of the water cup support device on the carrying member 5 for reliable storage of the water cup 4. It should also be noted that two, three, or more hanging bodies 1 may be arranged on the connecting structure 7.

For water cups 4 with handles 40, to ensure the handle 40 can be accommodated in the receiving cavity 10, referring to FIGS. 1, 2, 3, 4, and 7, in some embodiments, at least one hanging body 1 defines an avoidance gap 11 axially penetrating the corresponding hanging body 1, which is communicated the receiving cavity 10 to an exterior and can accommodate the handle 40 of the water cup 4. Specifically, the avoidance gap 11 transforms the ring-shaped hanging body 1 into an open-loop structure. When the water cup 4 is inserted vertically in the receiving cavity 10, the handle 40 aligns with the avoidance gap 11, allowing the water cup 4 to reach an intended position where the outer wall of the water cup 4 closely fits the force-bearing face 100.

In some embodiments, a position of the avoidance gap 11 and a position of the connecting assembly 2 are offset from each other, and the avoidance gap 11 and the connecting assembly 2 are asymmetrically distributed along a circumferential direction of the receiving cavity 10. For example, referring to FIG. 4, the hanging body 1 is arranged as a ring structure, each of an axis L1 of the connecting assembly 2 and an axis L2 of the avoidance gap 11 passes through a center of the ring structure, and the axis L1 and the axis L2 forms a 90° angle. When the connecting assembly 2 is fixed to the carrying member 5, the axis L2 of the avoidance gap

11 is parallel to a connection face between the carrying member 5 and the connecting assembly 2. For a satchel 50 carried on the shoulder, this offset arrangement allows the user to more easily retrieve the water cup 4 from the hanging body 1 or insert the water cup 4 into the receiving cavity 10 of the hanging body 1, improving user experience.

Figure 15:
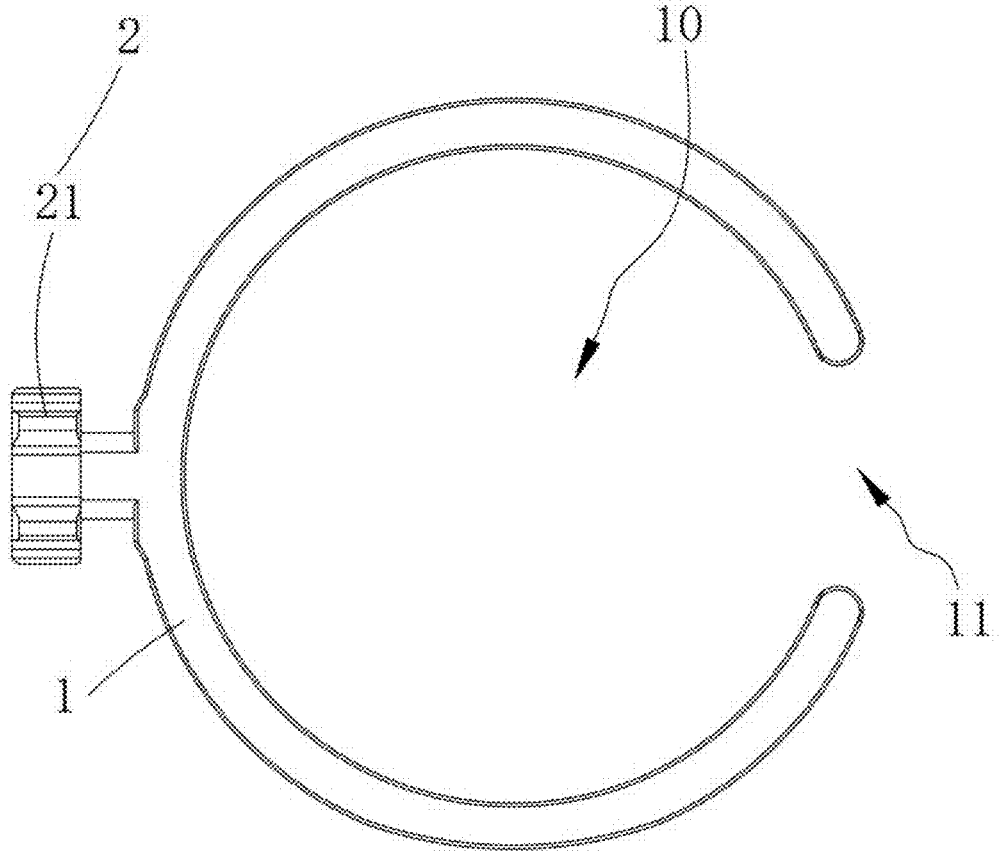
FIG. 15 is a front projection view of the hanging body according to other embodiments of the present disclosure.

Referring to FIG. 15, in other embodiments, the position of the avoidance gap 11 and the position of the connecting assembly 2 are offset from each other, and the avoidance gap 11 and the connecting assembly 2 are symmetrically distributed along the circumferential direction of the receiving cavity 10. This arrangement is suitable for specific scenarios, such as when the carrying member 5 is a wall. The connecting assembly 2 is connected to the wall, and the symmetrically positioned avoidance gap 11 allows the handle 40 of the water cup 4 to extend away from the wall, facilitating retrieval of the water cup 4 from the hanging body 1.

Figure 6:
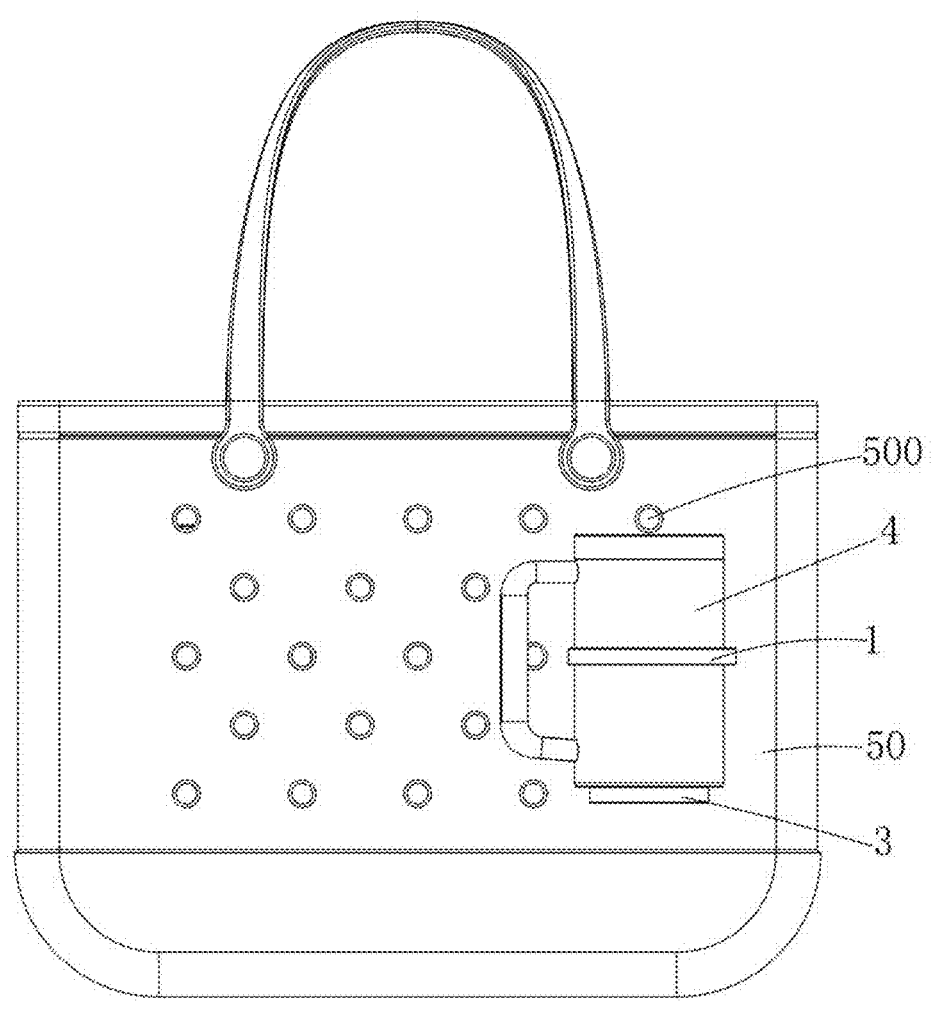
FIG. 6 is a front view of the water cup support device according to Embodiment III of the present disclosure, showing a usage state of a support member supporting the water cup.

Referring to FIG. 6, in some embodiments, the water cup support device further includes a support member 3. The support member 3 is detachably fixed to the carrying member 5 and can support a bottom portion of the water cup 4. Specifically, the connecting assembly 2 can be arranged on an outer wall of the support member 3. The support member 3 can be fixed to the carrying member 5 via the connecting assembly 2. After the water cup 4 is inserted vertically to the hanging body 1, the bottom portion of the water cup 4 abuts against a top face of the support member 3, providing an axial limit to the water cup 4, enhancing support stability to the water cup 4.

Figure 4:
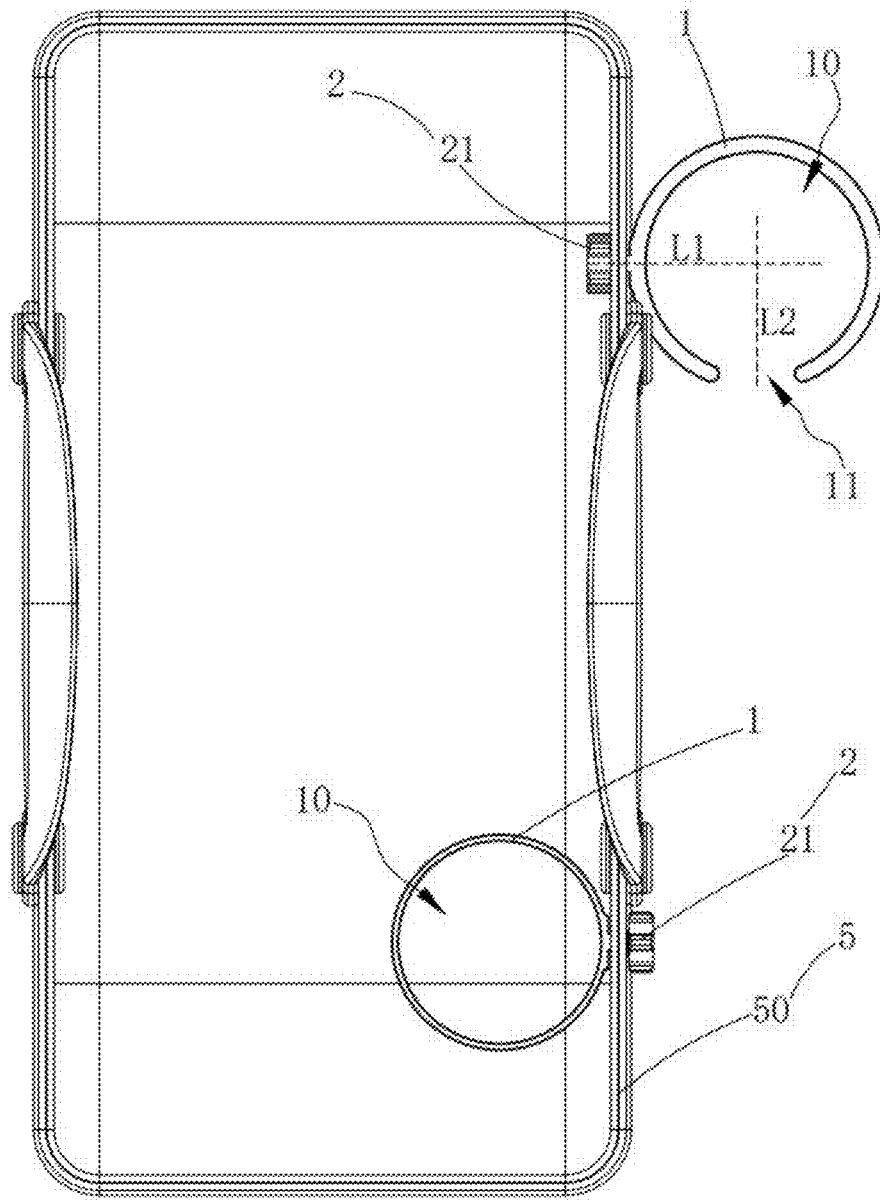
FIG. 4 is a connection view of a hanging body and a carrying member according to Embodiment I of the present disclosure.

Referring to FIGS. 3 and 4, in some embodiments, the connecting assembly 2 includes a connecting stud 20 and a limiting nut 21. The connecting stud 20 fixed to the hanging body 1. The limiting nut 21 threadedly engaged with the connecting stud 20 to clamp the carrying member 5.

Specifically, one end of the connecting stud 20 can pass through the carrying member 5 and can be secured with the limiting nut 21, fixing the hanging body 1 to the carrying member 5. The limiting nut 21 can be rotated to control a clamping force on the carrying member 5 by the connecting stud 20 and the limiting nut 21, simplifying installation compared to traditional hook-and-loop methods that require threading through multiple holes.

Figure 11:
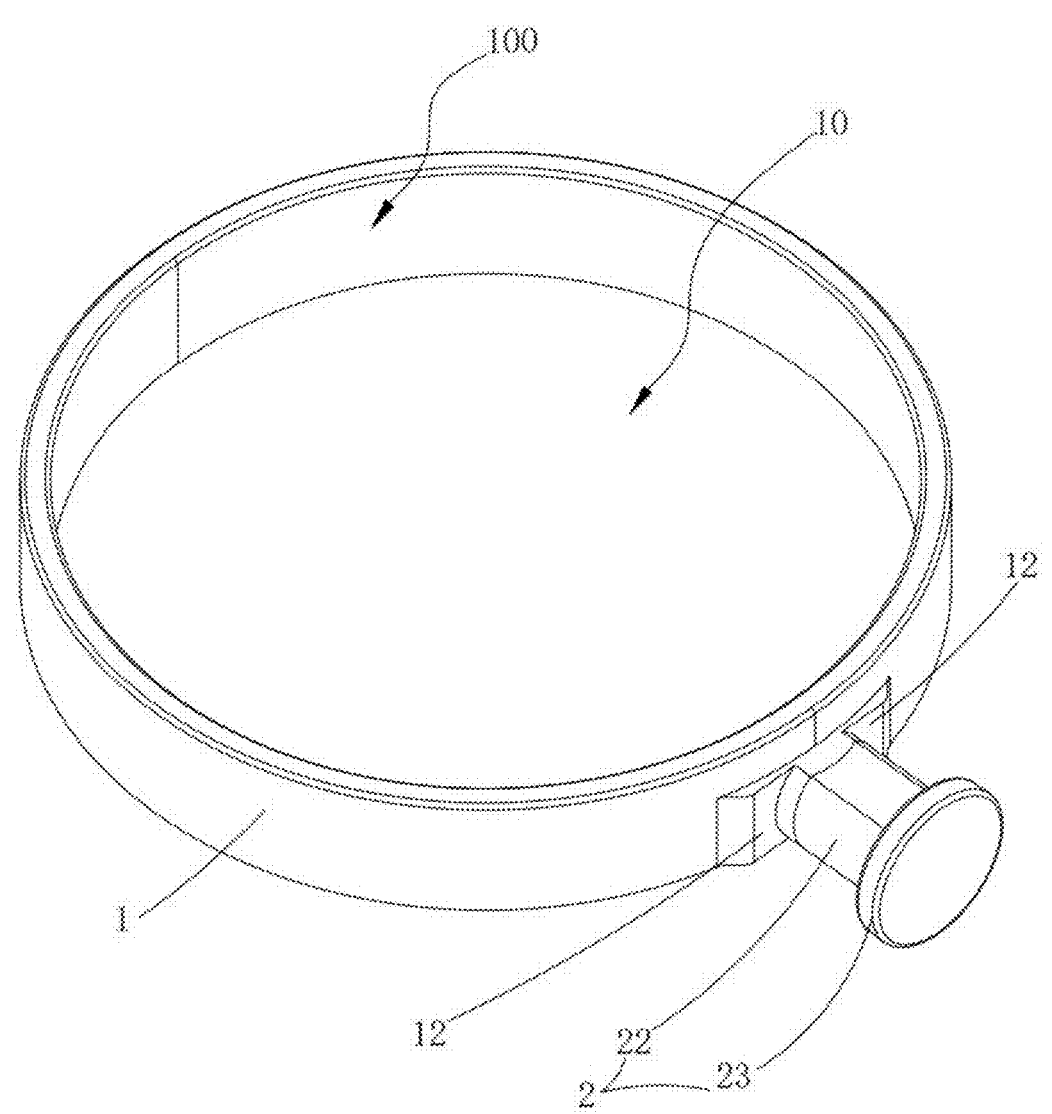
FIG. 11 is a schematic view of the overall structure of the water cup support device according to Embodiment V of the present disclosure.

Referring to FIG. 11, in some embodiments, the connecting assembly 2 includes a connecting post 22 and a limiting block 23. The connecting post 22 is fixed to the hanging body 1, and the limiting block 23 is arranged at an end of the connecting post 22. An outer diameter of the limiting block 23 is larger than an outer diameter of the connecting post 22. The limiting block 23 is elastically deformable. Specifically, for carrying members 5 with holes, the deformable limiting block 23 is allowed to pass through the holes of the carrying members 5 by means of compression. The larger outer diameter of the limiting block 23 prevents the limiting block 23 from detaching from the hole of the carrying member 5 without an external force, securing the hanging body 1 to the carrying member 5.

In summary, the above two connecting assembly 2 are suitable for carrying members 5 with holes, such as when the carrying member 5 is specifically a satchel 50 or a backpack. The connecting assembly 2 may also use non-detachable fasteners like rivets or clinch nuts. These fasteners are installed on the outer wall of the hanging body 1, then passed through the holes of the carrying member 5. Special pressing equipment is used to secure the fasteners onto the outer wall of the carrying member 5, ensuring that the hanging body 1 is stably and firmly mounted on the carrying member 5 for storing the water cup 4.

Figure 12:
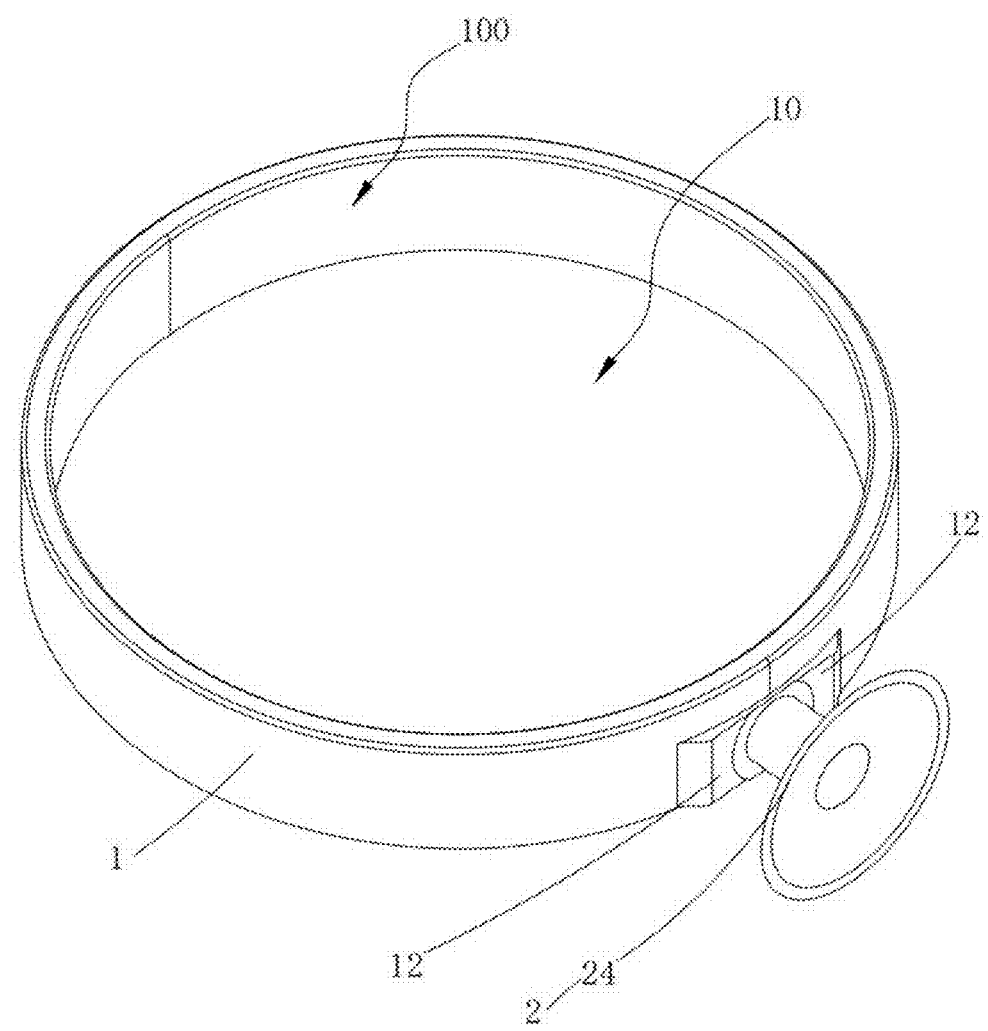
FIG. 12 is a schematic view of the overall structure of the water cup support device according to Embodiment VI of the present disclosure.

Referring to FIG. 12, in some embodiments, the connecting assembly 2 includes a connecting suction cup 24, which can be adsorbed and fixed to the carrying member 5. Specifically, the connecting suction cup 24 may be a magnetic suction cup or a vacuum suction cup. By adsorbing the connecting suction cup 24 onto an outer face of the carrying member 5, the hanging body 1 can be fixed to the carrying member 5. In this case, the carrying member 5 can specifically be an object with a smooth surface, such as a wall.

To further improve stability of the hanging body 1 on the carrying member 5, in some embodiments, the outer wall of the hanging body 1 is arranged with a contact wall face 12 at a connection point with the connecting assembly 2. As shown in FIGS. 2, 11, and 12, when the connecting assembly 2 is fixed to the carrying member 5, the contact wall face 12 can conform to the outer face of the carrying member 5. The contact wall face 12 may specifically be a flat plane. By means of the contact wall face 12, a contact area between the hanging body 1 and the carrying member 5 can be increased, thereby enhancing connection stability between the hanging body 1 and the carrying member 5.

Figure 8:
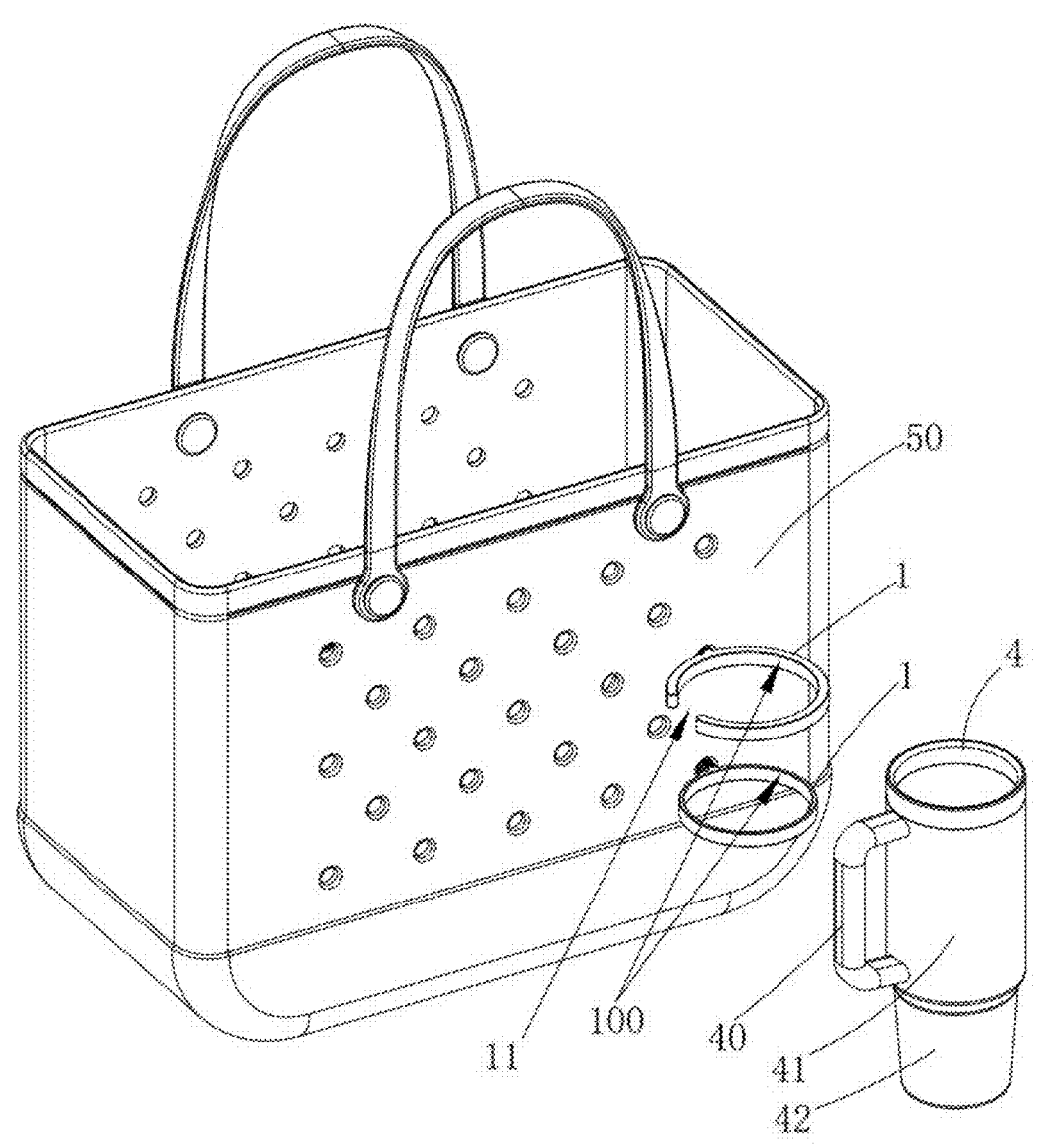
FIG. 8 is an exploded view of the water cup support device according to Embodiment IV of the present disclosure.
Figure 9:
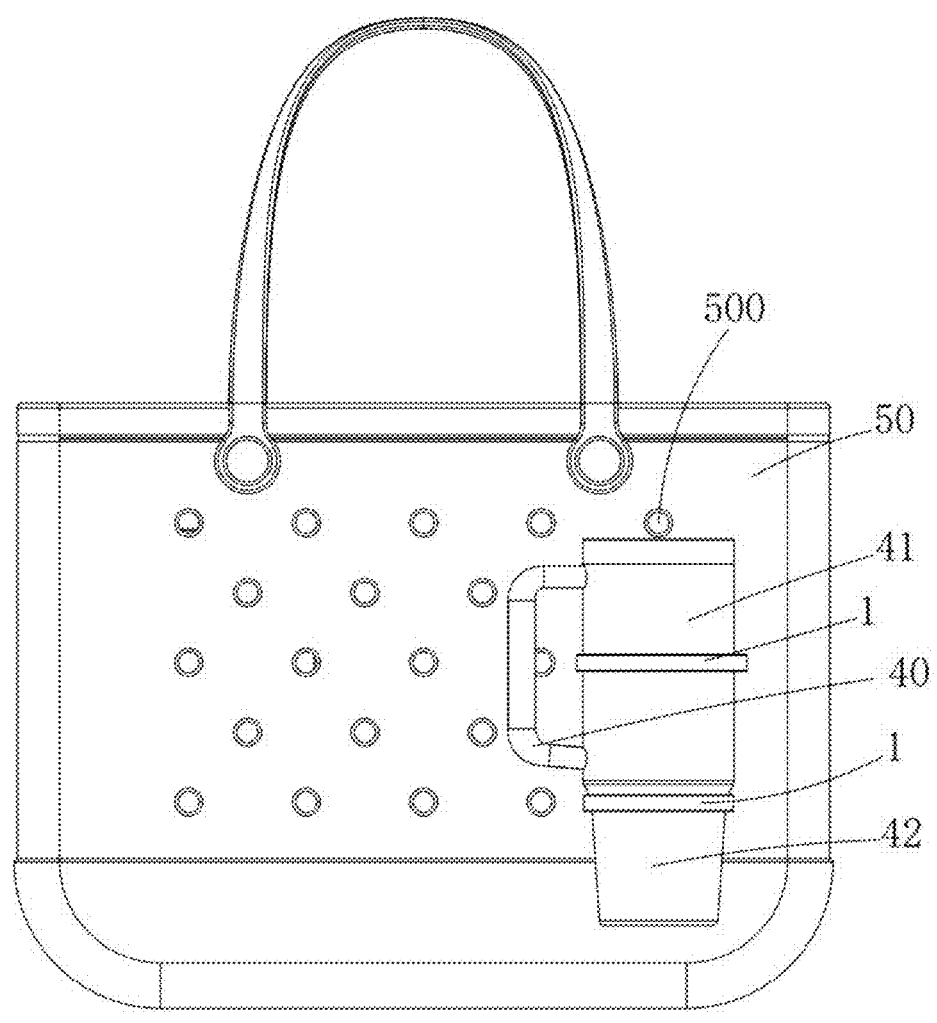
FIG. 9 is a front projection view of the water cup support device according to Embodiment IV of the present disclosure.
Figure 13:
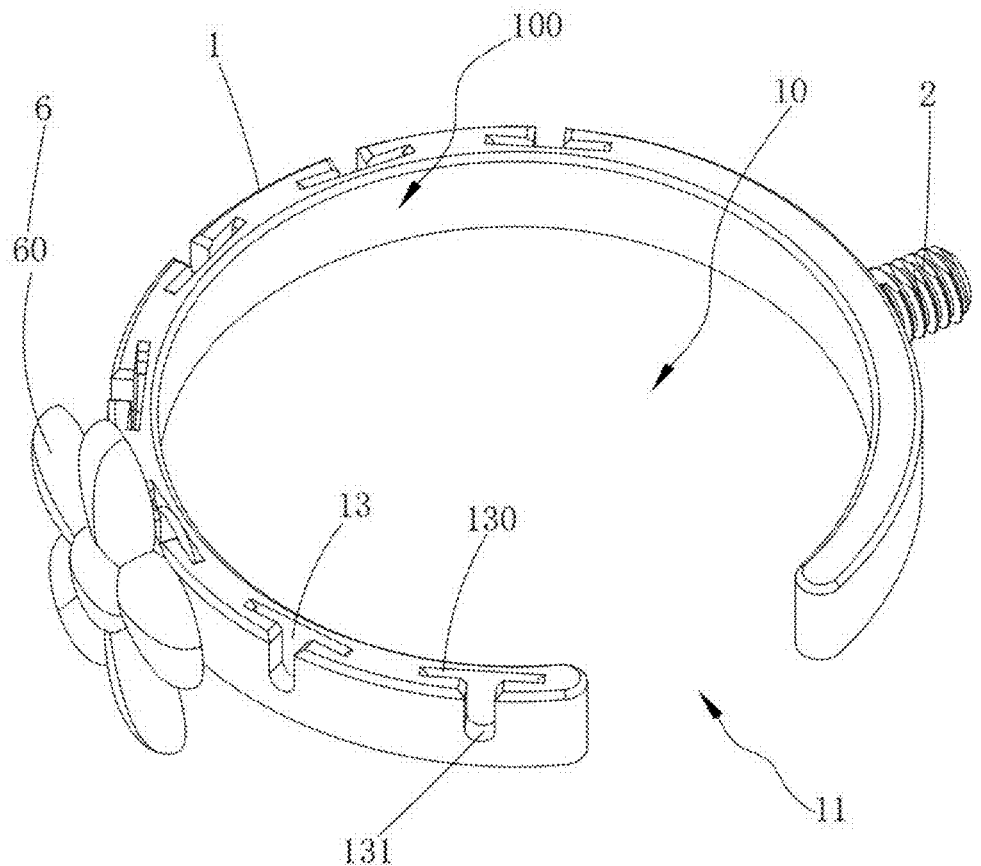
FIG. 13 is a schematic view of the overall structure of the water cup support device according to Embodiment VII of the present disclosure, with a functional accessory mounted on the hanging body.
Figure 14:
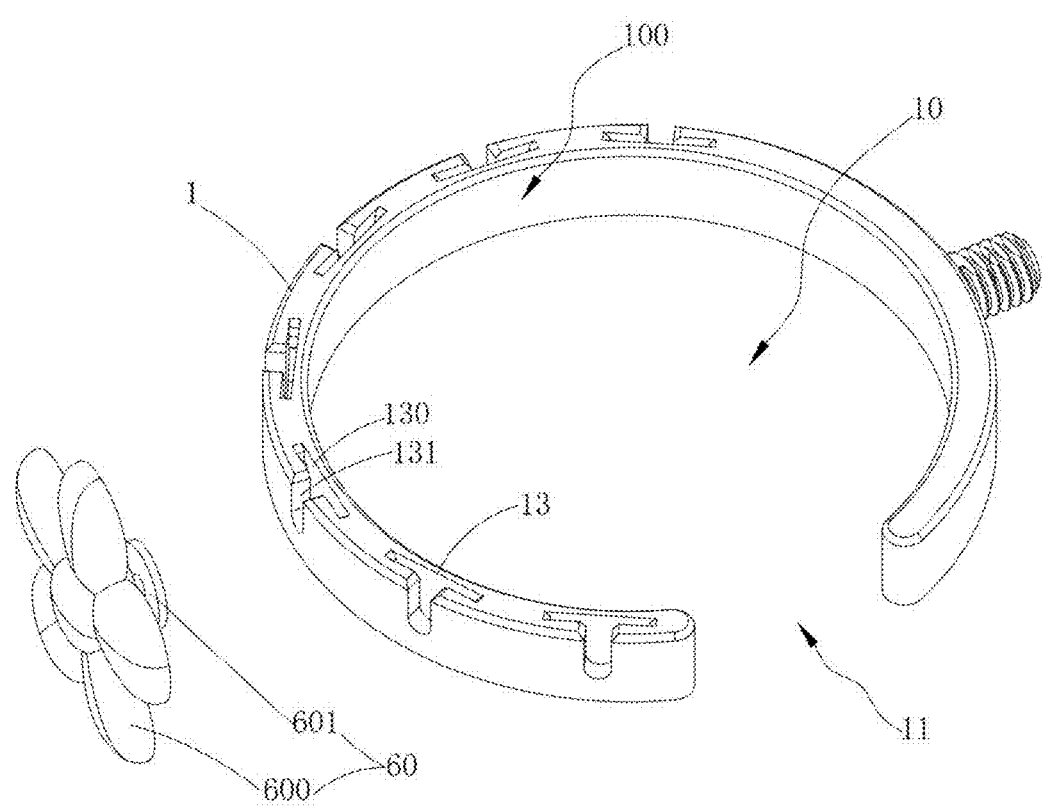
FIG. 14 is an exploded view of the water cup support device according to Embodiment VII of the present disclosure.

Referring to FIGS. 13-14, in some embodiments, the hanging body 1 defines a plurality of external interfaces 13 for installing functional accessories 6. The functional accessories 6 may specifically be decorative objects as shown in FIGS. 7-8, enhancing overall aesthetic appeal of the water cup support device when applied to the carrying member 5. In some embodiments, the functional accessories 6 may also include light-emitting components such as LED beads. Through the external interfaces 13, functionality and visual appeal of the water cup support device can be expanded to meet diverse outdoor usage requirements.

Referring to FIGS. 7-8, in some embodiments, the external interface 13 includes a top opening 130 and a side opening 131. The top opening 130 is used for inserting the functional accessory 6, while the side opening 131 serves to expose the functional accessory 6. For clarity, the functional accessory 6 may be selected as the decorative object 60 illustrated in FIGS. 7-8. The decorative object 60 includes a decorative petal 600 and a T-shaped column 601 connected to a bottom portion of the decorative petal 600. The T-shaped column 601 is snap-fitted into the external interface 13 via the top opening 130, with a portion of the T-shaped column 601 close to the decorative petal 600 extending through the side opening 131. In this way, the decorative petal 600 is positioned on the outer wall of the hanging body 1, thereby improving aesthetic quality of the water cup support device.

The following combines the above content into multiple embodiments for further explanation:

As shown in Embodiment 1 of FIGS. 1-4, the water cup support device in this embodiment includes two hanging bodies 1. The inner diameters of the force-bearing faces 100 of the two hanging bodies 1 are different from each other. The hanging body 1 with the larger inner diameter defines an avoidance gap 11, and the hanging body 1 with the smaller inner diameter defines a closed-loop receiving cavity 10. The connecting assembly 2 on the hanging body 1 includes a connecting stud 20 and a limiting nut 21. This water cup support device is mainly used for the water cup 4 shown in FIG. 2. The water cup 4 includes an upper cup body 41 with a larger outer diameter and a lower cup body 42 with a smaller outer diameter, and the handle 40 is arranged on the outer wall of the upper cup body 41. As shown in FIGS. 7 to 10, the carrying member 5 is selected as the satchel 50 shown in FIG. 7, and the satchel 50 defines a plurality of mounting holes 500 for mounting the connecting assembly 2. Based on this, the hanging body 1 with the larger inner diameter in this embodiment is connected to the outer wall of the upper cup body 41, and the handle 40 of the upper cup body 41 is avoided through the avoidance gap 11, ensuring that the water cup 4 can be inserted in the receiving cavities 10 of the two hanging bodies 1 from top to bottom. The hanging body 1 with the smaller inner diameter is connected to the outer wall of the lower cup body 42, and a top face of the hanging body 1 abuts against the bottom portion of the upper cup body 41, realizing axial limiting and supporting for the water cup 4.

Figure 5:
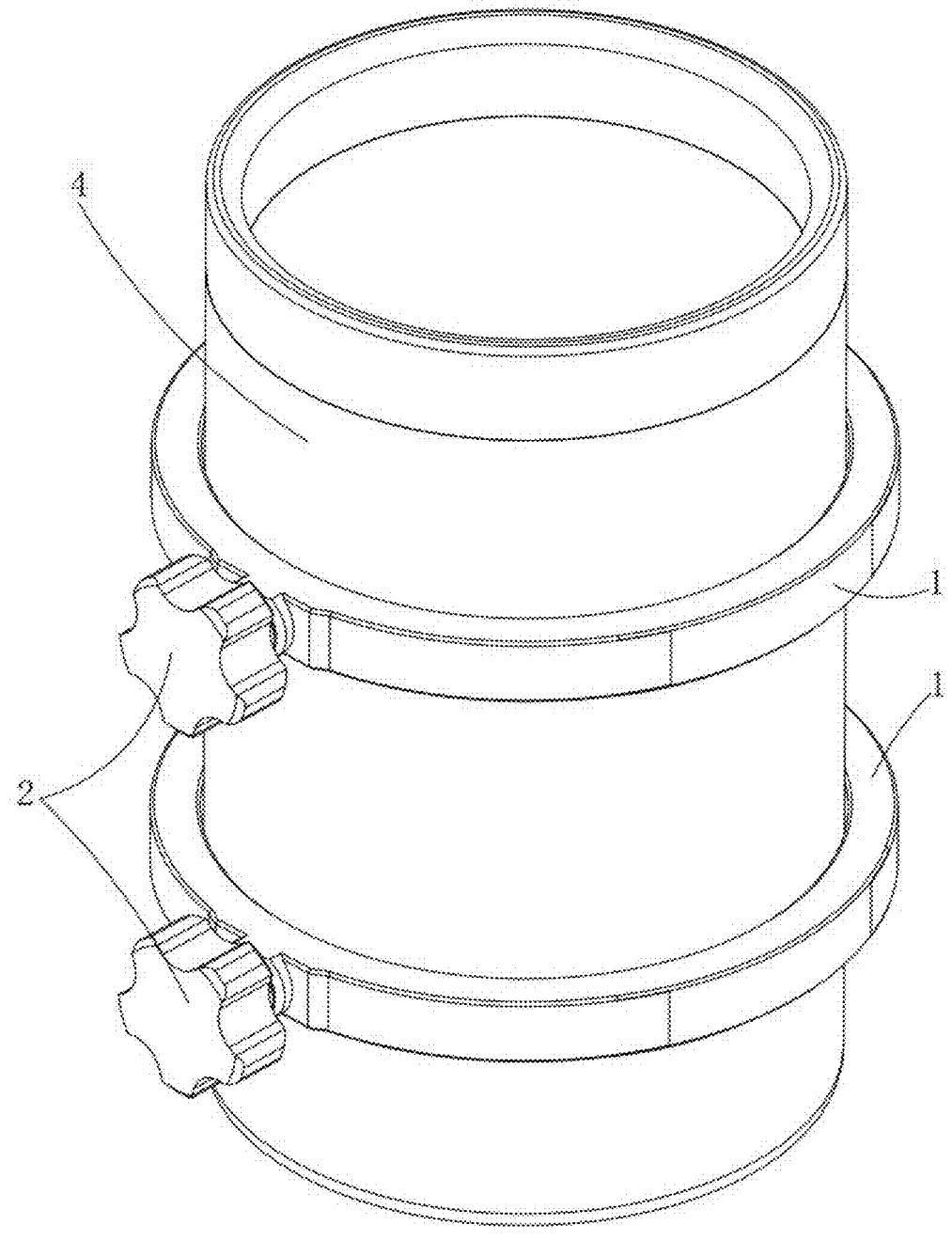
FIG. 5 is a schematic view of the overall structure of the water cup support device according to Embodiment II of the present disclosure, with a water cup received in the hanging body.

As shown in Embodiment 2 of FIG. 5, the water cup support device in this embodiment is substantially the same as the water cup support device in the aforementioned Embodiment 1, and the similarities will not be repeated here. The main difference between the two is that the water cup support device in this embodiment includes two hanging bodies 1, the receiving cavity 10 of each of the two hanging bodies 1 is a closed-loop structure. The water cup support device in this embodiment is mainly used for water cups 4 without a handle 40. For this type of water cup 4, there is no need to define an avoidance gap 11 in the hanging body 1.

As shown in Embodiment 3 of FIG. 6, the water cup support device in this embodiment is largely the same as the water cup support device in the aforementioned Embodiment 1, and the similarities will not be repeated here. The main difference between the two is that the water cup support device in this embodiment includes at least one hanging body 1 and a support member 3. Both the hanging body 1 and the support member 3 are fixed to the carrying member 5 via the connecting assembly 2. The hanging body 1 and the support member 3 are spaced apart from each other. For a water cup 4 with a handle 40, an avoidance gap 11 can be opened on the hanging body 1. For a water cup 4 without a handle 40, a closed-loop design can be used. During use, after inserting the water cup 4 in the hanging body 1, the bottom portion of the water cup 4 abuts against a top face of the support member 3, and thus the support member 3 can limit and support the water cup 4.

Figure 10:
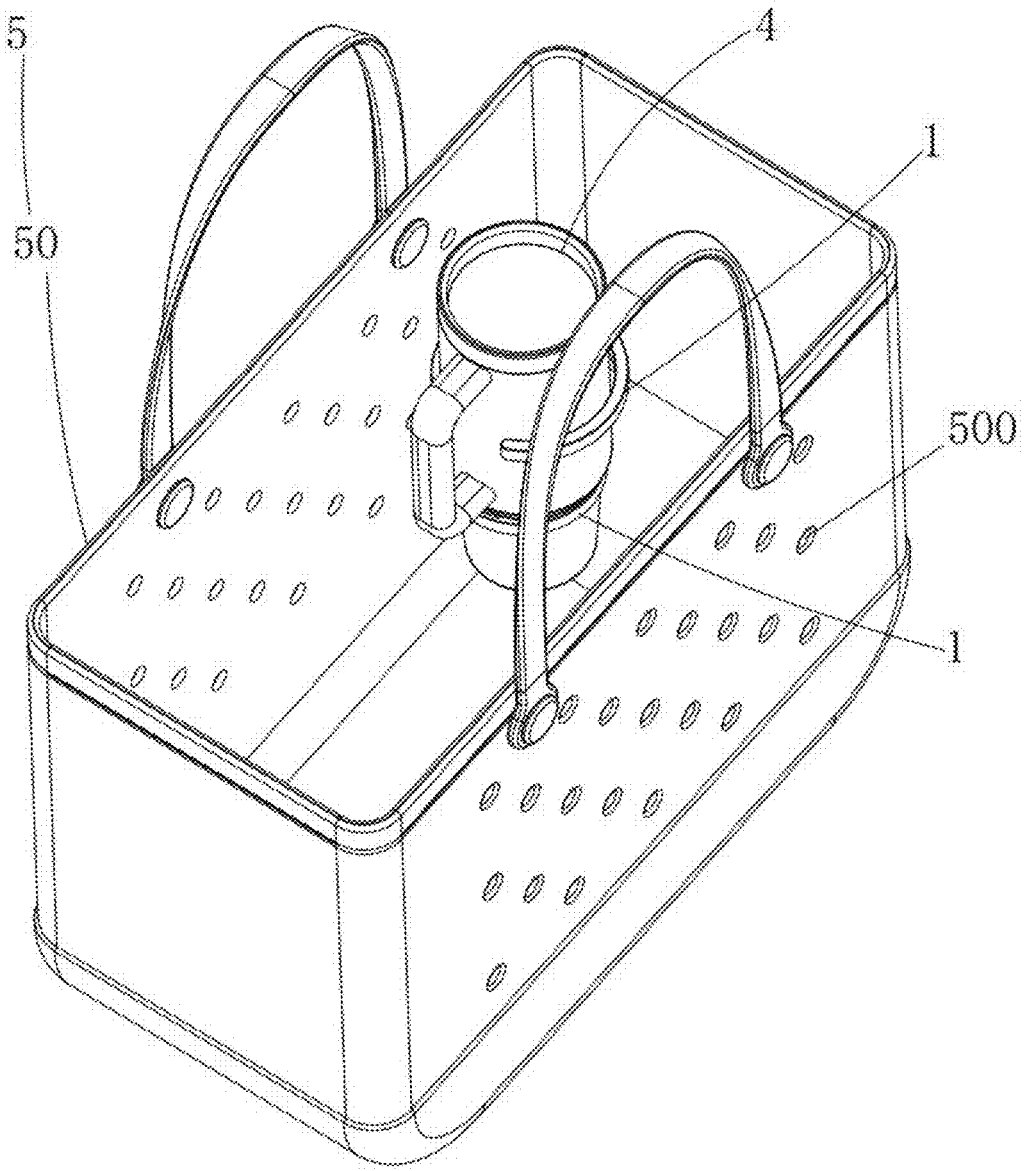
FIG. 10 is another schematic view of the overall structure of the water cup support device according to Embodiment IV of the present disclosure.

As shown in Embodiment 4 of FIGS. 7, 8, 9, and 10, this embodiment also provides a water cup storage system, which includes the water cup support device as described in Embodiment 1 and a satchel 50. A bag body of the satchel 50 defines a plurality of mounting holes 500. Specifically, the carrying member 5 of Embodiment 1 is selected as the satchel 50. The connecting assembly 2 passes through the mounting holes 500 and fixes the hanging body 1 to an exterior or interior of bag body of the satchel 50. The water cup 4 can be vertically inserted in the receiving cavity 10 of the hanging body 1. Specifically, a plurality of mounting holes 500 are uniformly defined in a side face of the bag body of the satchel 50, making the satchel 50 more aesthetically pleasing overall. The connecting stud 20 of the connecting assembly 2 passes through corresponding mounting holes 500 and is then screw-connected with the limiting nut 21, thereby installing the two hanging bodies 1 of the water cup support device at a designated position on the satchel 50, and then the water cup 4 is vertically inserted in the receiving cavities 10 of the two hanging bodies 1. In actual use, the water cup 4 can be placed on the outer face or inside of the satchel 50 according to demand. FIG. 7 is a schematic view showing the water cup 4 placed on the outer face of the satchel 50, and FIG. 10 is a schematic view showing the water cup 4 placed inside the satchel 50.

As shown in Embodiment 5 of FIG. 11, the water cup support device in this embodiment is largely the same as the water cup support device in the aforementioned Embodiment 1, and the similarities will not be repeated here. The main difference between the two is that the connecting assembly 2 in this embodiment includes a connecting post 22 and a limiting block 23. The limiting block 23 is elastically deformable, allowing the hanging body 1 of this embodiment to be quickly fixed on a carrying member 5 with holes.

As shown in Embodiment 6 of FIG. 12, the water cup support device in this embodiment is largely the same as the water cup support device in the aforementioned Embodiment 1, the similarities won't be repeated here. The main difference between the two is that this embodiment's connecting assembly 2 includes a connecting suction cup 24. The connecting suction cup 24 can be a vacuum suction cup or a magnetic suction cup, allowing the hanging body 1 of this embodiment to be quickly secured to a carrying member 5 with a flat and smooth surface or a magnetic carrying member 5.

As shown in Embodiment 7 of FIGS. 13 and 14, the water cup support device in this embodiment is largely the same as the water cup support device in the aforementioned Embodiment 1, and the similarities will not be repeated here. The main difference between the two is that the hanging body 1 in this embodiment is further defines a plurality of external interfaces 13, through which various functional accessories 6 can be attached. The functional accessory 6 can specifically be a decorative object 60 as shown in FIG. 14. Through a snap-fit connection of the T-shaped column 601 with the external interface 13, the decorative petals 600 can be fixed to the outer wall of the hanging body 1, thereby making the water cup support device of this embodiment more aesthetically pleasing.

As shown in Embodiment 8 of FIG. 16, the water cup support device in this embodiment is largely the same as the water cup support device in the aforementioned Embodiment 1, and the similarities will not be repeated here. The main difference between the two is that the water cup support device in this embodiment also includes a connecting structure 7 that connects the two hanging bodies 1. By having the connecting structure 7 fit against the outer wall of the carrying member 5, the stability of the water cup support device on the carrying member 5 can be effectively improved.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A water cup support device for supporting a water cup on a carrying member, wherein the water cup support device comprises: at least one hanging body, defining a receiving cavity, wherein the receiving cavity axially penetrates the at least on hanging body, and a circumferential inner wall of the at least one hanging body defining the receiving cavity forms a force-bearing face matched with an outer wall of the water cup; and a connecting assembly, arranged on the at least one hanging body, and configured to fix the at least one hanging body to the carrying member, wherein a contact wall face, configured to contact an outer wall of the carrying member, is arranged on a circumferential outer wall of the at least one hanging body away from the receiving cavity; the contact wall face is protruding from the circumferential outer wall; and the contact wall face is a substantially flat face.

2. The water cup support device as claimed in claim 1, wherein the force-bearing face is annular, an inner diameter of the force-bearing face is smaller than a maximum outer diameter of the water cup, and the force-bearing face is arranged in an interference fit with a portion of the outer wall of the water cup.

3. The water cup support device as claimed in claim 2, wherein the at least one hanging body comprises at least two sub-hanging bodies, the inner diameter of the force-bearing face of each of the at least two sub-hanging bodies is different from each other, the at least two sub-hanging bodies are spaced apart from each other on the carrying member, and the receiving cavity of each of the at least two sub-hanging bodies is coaxially arranged.

4. The water cup support device as claimed in claim 3, wherein at least one of the sub-hanging bodies defines an avoidance gap axially penetrating the at least one of the sub-hanging bodies, the avoidance gap communicates the receiving cavity with an exterior of the at least one of the sub-hanging bodies, and the avoidance gap is configured to bypass a handle of the water cup.

5. The water cup support device as claimed in claim 1, wherein the at least one hanging body defines an avoidance gap axially penetrating the at least one hanging body, the avoidance gap communicates the receiving cavity with an exterior of the at least one hanging body, and the avoidance gap is configured to bypass a handle of the water cup; and a position of the avoidance gap and a position of the connecting assembly are offset from each other, and the avoidance gap and the connecting assembly are asymmetrically distributed along a circumferential direction of the receiving cavity.

6. The water cup support device as claimed in claim 1, further comprising a support member, wherein the support member is detachably fixed to the carrying member, and the support member is configured to support a bottom portion of the water cup.

7. The water cup support device as claimed in claim 1, wherein the connecting assembly comprises:

a connecting stud, integrally formed with and fixed to the at least one hanging body; the connecting stud extending from the contact wall face in a substantially perpendicular direction, and a limiting nut, threadedly engaged with the connecting stud, and configured to clamp the carrying member.

8. The water cup support device as claimed in claim 1, wherein the connecting assembly comprises a connecting suction cup, wherein the connecting suction cup is configured to absorb and be fixed to the carrying member.

9. The water cup support device as claimed in claim 8, wherein the connecting suction cup comprises a magnetic suction cup or a vacuum suction cup.

10. The water cup support device as claimed in claim 1, wherein the outer wall of the at least one hanging body is arranged at a connection point where the at least one hanging body is connected with the connecting assembly, and when the connecting assembly is fixed to the carrying member, the contact wall face adheres to the outer wall face of the carrying member.

11. The water cup support device as claimed in claim 10, wherein, a step is formed between the contact wall face and the circumferential outer wall.

12. The water cup support device as claimed in claim 11, wherein, an inclined side wall is arranged for connecting the contact wall face and the circumferential outer wall, the inclined side wall is extending inclined with respect to the flat contact wall face.

13. The water cup support device as claimed in claim 11, wherein the connecting assembly comprises:

a connecting post, fixed to the at least one hanging body and formed on and extending from an outer surface of the contact wall face away from the receiving cavity; and a limiting block, arranged at an end of the connecting post, wherein an outer diameter of the limiting block is larger than an outer diameter of the connecting post.

14. The water cup support device as claimed in claim 1, further comprising a connecting structure, wherein the at least one hanging body comprises at least two sub-hanging bodies, the at least two sub-hanging bodies are spaced apart from each other on the connecting structure, and the receiving cavity of each of the at least two sub-hanging bodies is coaxially arranged with each other;

the connecting structure is capable of adhering to the carrying member.

15. A water cup support device for supporting a water cup on a carrying member, wherein the water cup support device comprises:

at least one hanging body, defining a receiving cavity, wherein the receiving cavity axially penetrates the at least on hanging body, and a circumferential inner wall of the at least one hanging body defining the receiving cavity forms a force-bearing face matched with an outer wall of the water cup; and a connecting assembly, arranged on the at least one hanging body, and configured to fix the at least one hanging body to the carrying member;

wherein the connecting assembly comprises:

a connecting post, integrally formed with and fixed to the at least one hanging body, wherein, the connecting post is formed by extending from a circumferential outer wall of the at least one hanging body away from the receiving cavity; and a limiting block, arranged at an end of the connecting post, wherein an outer diameter of the limiting block is larger than an outer diameter of the connecting post, and the limiting block is elastically deformable.

16. The water cup support device as claimed in claim 15, wherein, a portion of the circumferential outer wall is protruding away from the receiving cavity to form a contact wall face that is used to attach to an outer wall face of the carrying member when the connecting assembly is fixed to the carrying member; the connecting post is extending from the contact wall face.

17. The water cup support device as claimed in claim 16, wherein, a step is formed between the contact wall face and the circumferential outer wall; and an inclined side wall is arranged for connecting the contact wall face and the circumferential outer wall, the inclined side wall is extending inclined with respect to the flat contact wall face.

18. A water cup support device, for supporting a water cup on a carrying member, wherein the water cup support device comprises: at least one hanging body, defining a receiving cavity, wherein the receiving cavity axially penetrates the at least on hanging body, and a circumferential inner wall of the at least one hanging body defining the receiving cavity forms a force-bearing face matched with an outer wall of the water cup; and a connecting assembly, arranged on the at least one hanging body, and configured to fix the at least one hanging body to the carrying member; wherein the at least one hanging body defines a plurality of external interfaces, and each of the plurality of external interfaces is configured to mount a functional accessory; wherein the each of the plurality of external interfaces comprise: a top opening, configured to insert the functional accessory; and a side opening, configured to expose the functional accessory.

\*  \*  \*  \*  \*